UNITED STATES PATENT OFFICE.

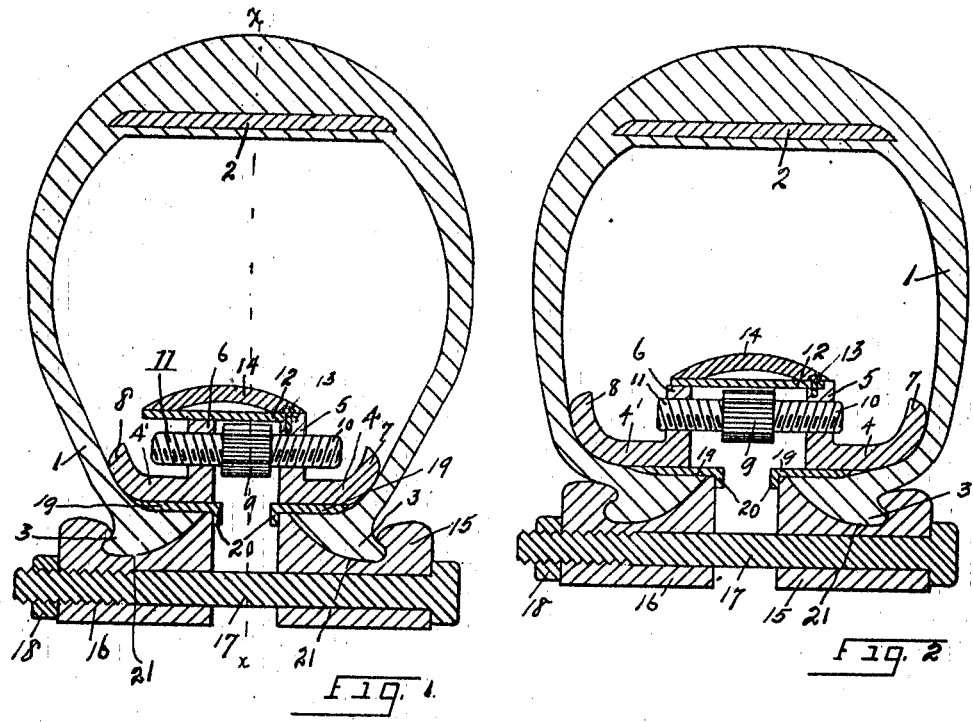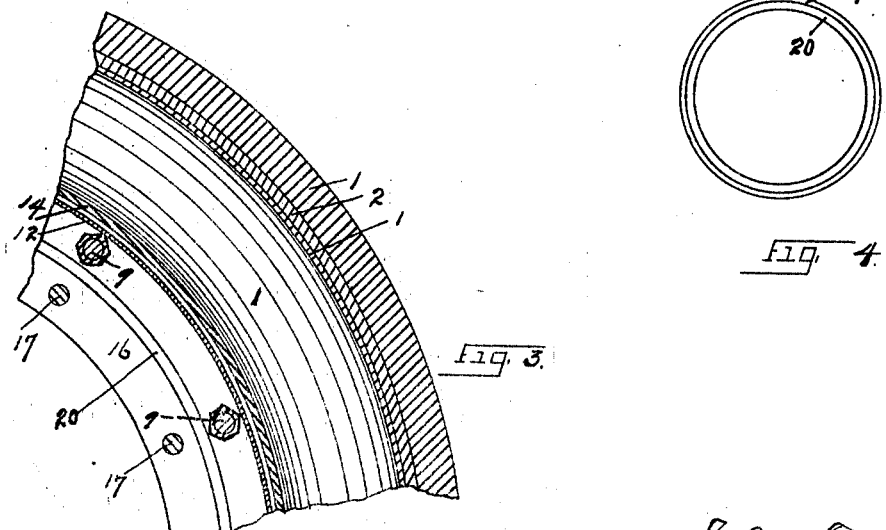

JOHN T. CLARK, OF PROVO, UTAH.

RESILIENT TIRE FOR VEHICLES.

1,059,437.   Specification of Letters Patent.   Patented Apr. 22, 1913.

Application filed June 8, 1912. Serial No. 702,579.

*To all whom it may concern:*

Be it known that I, JOHN T. CLARK, a citizen of the United States, residing at Provo city, in the county of Utah and State of Utah, have invented certain new and useful Improvements in Resilient Tires for Vehicles, of which the following is a specification.

My invention relates to vehicle tires, and has for its object to provide a tire which may be expanded by mechanical means instead of by pneumatic inner tube that is now commonly used, and to provide a tire which will not collapse if punctured and will be flexible and resilient. These objects I accomplish with the device illustrated in the accompanying drawings in which similar letters of reference indicate like parts throughout the several figures and as described in the specifications forming a part of this application, and as pointed out in the appended claims.

The preferred form of my invention is shown in the drawings in which—

Figure 1 is a transverse section on a radial line, before the tire is expanded. Fig. 2 is a vertical section of the same after the tire is expanded. Fig. 3 is a fragmentary view of a section of my tire on line $x$ $x$ of Fig. 1. Fig. 4 is a plan view, much diminished, of one of the guide bands.

My tire consists of an outer casing 1 within which an endless spring band 2 is built in and made a part thereof. Said casing 1 has the edges thereof made thicker and a lug or rib 3 formed thereon. Within said casing 1 are placed and spaced apart two metal bands 4 and 4', and it is not at all necessary that they are composed of spring metal. Said band 4 has an extended flange 5 thereon at right angles to the axis of said band and also an extended flange 7 curved from the plane of said band. Said band 4' has an extended flange 6 thereon at right angles to the axis of said band and a flange 8 on the other edge thereof, curved from the plane of said band. Through the flanges 5 and 6 are provided threaded openings, within which the end portions of the turn-buckles 9 engage. One end of each of said turn buckles 9 is threaded to the right as shown at 10 and the other to the left as shown at 11. Secured on the peripheric face of said flange 5 of the band 4 is a circular band by means of threaded tap nuts 13. On the outer face of said band 12 is secured a circular cushion band 14. The edge of said band 12 opposite the tap nuts 13 rests on the peripheric face of said flange 6 of the band 4'. Within and adjacent said bands 4 and 4' are placed the circular endless guide bands 19, each of which has an inwardly extended flange 20. Within said guide bands 19 are placed the annular bands 15 and 16, each of which has a channel 21 cut or formed in the peripheric face thereof, within which channels are fitted the edges of said outer casing 1. The outer side of each of said channels 21 engages the lugs 3 on the edge of said outer casing. Said annular bands 15 and 16 have alined openings therethrough, within which openings are placed the threaded bolts 17; and by means of said threaded bolts 17, said bands 15 and 16 are drawn together, thereby binding said casing 1 into tubular form, as shown in Fig. 1. Said threaded bolts 17 are held in place by the nuts 18 screwed thereon. To draw said spring band 2 into, and to hold it in, concentric relation with the bands 4 and 4', the turn buckles 9 are rotated. Said rotation or turning of said turn buckles 9 with the right and left threads on the ends thereof engaging within the threaded openings in said bands 4 and 4', will widen the space between said bands, and said casing will be made to assume the position shown in Fig. 2. The said inwardly extended flanges 20 hold said guide bands 19 in fixed relation to the annular bands 15 and 16 and provide a metal contact for the outward sliding of said bands 4 and 4' on the inner side of the casing 1. The band 12 forms a closure for the inside of the tubular casing 1 and prevents gravel, grit and water from entering the interior of the tire when used on the road. The circular cushion band 14, secured on the peripheric face of said band 12, is provided to act as a cushion or bumper for the inside of said casing 1 and make any contact noiseless should the compression be great, or the weight of the load carried by the vehicle be such as to compress the spring band 2 to such an extent that the inner annular face of the casing 1 would contact with the expanding elements. The widening of the space between the two bands 4 and 4' and the holding of them apart by the turn-buckles 9, secure by mechanical means, a resiliency in the tire, similar to that accomplished with an inflated tire now used on certain vehicles.

Having thus described my invention I desire to secure by Letters Patent and claim:

1. A resilient tire for vehicles consisting of an outer casing; a spring band built into and forming a part of said casing; two annular bands concentrically spaced from said spring band and carried within said casing; outwardly extended flanges on each of said annular bands, one of the said flanges on each of said bands having alined threaded openings therethrough; turn-buckles operated within said openings; two annular metal bands each having a channel in the peripheric face thereof adapted to engage the edge of said casing and coöperating with the two outer of said outwardly extended flanges, to tension said casing transversely of the tire; and bolts with nuts screwed thereon adapted to hold said last mentioned annular bands and the edges of said casing in fixed relation to each other.

2. A resilient tire for vehicles consisting of an outer casing; a metal spring band built into said casing; two annular metal bands carried within said casing and concentrically spaced from said spring band; means to adjust the position of said annular bands within said casing in relation to each other to tension said outer casing; a flat band adapted to bridge the space between said annular bands; and two metal bands each having a channel in the peripheric face thereof and adapted to grip the edges of said casing, and to hold them in fixed relation with each other when the space between the first mentioned annular bands is increased to tension said outer casing.

3. A resilient tire for vehicles consisting of a casing; a spring band built into and forming a part of said casing; two annular metal bands spaced apart and concentrically spaced from said spring band; outwardly extended flanges on each of said annular bands one of said flanges on each of said bands having alined threaded openings therein; the outer of said flanges bearing against said casing and coöperating to tension said casing; turn-buckles operated within said openings to change the position of said annular metal bands in said casing; two guide bands contiguously placed within said annular bands adapted to coöperate with said outwardly extended flanges in tensioning the casing transversely of said tire; an inwardly extended flange on each of said guide bands; a flat band adapted to bridge the space between said annular bands; two annular metal bands each having a channel in the peripheric face thereof adapted to engage the edge of said casing; and bolts with nuts screwed thereon adapted to hold said last mentioned annular bands and the edges of said casing in fixed relation with each other.

In testimony whereof I have affixed my signature in presence of two witnesses.

JOHN T. CLARK.

Witnesses:
SAM RANEY,
GUILD B. BLAKELY.